(12) United States Patent
Taylor et al.

(10) Patent No.: US 9,327,619 B2
(45) Date of Patent: May 3, 2016

(54) CHILD SAFETY SEAT

(71) Applicants: Andrew J. Taylor, Mohnton, PA (US); Kyle S. Mason, West Lawn, PA (US)

(72) Inventors: Andrew J. Taylor, Mohnton, PA (US); Kyle S. Mason, West Lawn, PA (US)

(73) Assignee: Wonderland Nurserygood Company Limited, Kwai Chung, N.T. (HK)

( * ) Notice: Subject to any disclaimer, the term of this patent is extended or adjusted under 35 U.S.C. 154(b) by 0 days.

(21) Appl. No.: 14/198,607

(22) Filed: Mar. 6, 2014

(65) Prior Publication Data

US 2014/0252827 A1    Sep. 11, 2014

Related U.S. Application Data

(60) Provisional application No. 61/851,466, filed on Mar. 8, 2013.

(51) Int. Cl.
    *B60N 2/28*      (2006.01)

(52) U.S. Cl.
    CPC ............ *B60N 2/2875* (2013.01); *B60N 2/2851* (2013.01); *B60N 2/2866* (2013.01)

(58) Field of Classification Search
    CPC ... B60N 2/2851; B60N 2/2866; B60N 2/2875
    See application file for complete search history.

(56) References Cited

U.S. PATENT DOCUMENTS

| | | | |
|---|---|---|---|
| 4,500,133 A * | 2/1985 | Nakao et al. | 297/131 |
| 4,733,909 A * | 3/1988 | Single et al. | 297/256.13 |
| 5,110,182 A | 5/1992 | Beauvais | |
| 5,551,751 A * | 9/1996 | Sedlack et al. | 297/256.13 |
| 5,746,478 A | 5/1998 | Lumley | |
| 5,836,650 A * | 11/1998 | Warner et al. | 297/256.11 |
| 6,299,249 B1 | 10/2001 | Mori | |
| 6,347,832 B2 * | 2/2002 | Mori | 297/256.13 |
| 6,428,099 B1 * | 8/2002 | Kain | 297/256.1 |
| 2002/0084580 A1 * | 7/2002 | Shiau | B65H 5/062 271/272 |
| 2002/0084680 A1 | 7/2002 | Kain | |
| 2005/0151402 A1 | 7/2005 | Balensiefer | |
| 2006/0055218 A1 * | 3/2006 | Barker | B60N 2/2803 297/250.1 |
| 2006/0138825 A1 * | 6/2006 | Eros | B60N 2/2875 297/256.13 |
| 2009/0322132 A1 * | 12/2009 | Gillett | 297/256.13 |
| 2010/0164265 A1 * | 7/2010 | Tomandl | 297/326 |
| 2011/0169309 A1 | 7/2011 | Williams | |
| 2013/0043706 A1 | 2/2013 | Gaudreau, Jr. | |

(Continued)

FOREIGN PATENT DOCUMENTS

CN      201604545 U      10/2010
CN      203528331 U      4/2014

(Continued)

*Primary Examiner* — Patrick Maestri
(74) *Attorney, Agent, or Firm* — Winston Hsu; Scott Margo

(57) ABSTRACT

A child safety seat includes a seat body, a reclining foot, and a force-generating member. The reclining foot is connected to a lower portion of the seat body such that the reclining foot is capable of rotating and sliding relative to the seat body to be selectively located at a first position or a second position relative to the seat body. The force-generating member is connected to the seat body and the reclining foot for applying a force to the reclining foot for urging the reclining foot to move toward the first position. When at the first position, the reclining foot can be rotated relative to the seat body and slid relative to the seat body in a distance to be blocked by a blocking structure at the lower portion from rotating reversely under the force so as to be located at the second position.

8 Claims, 10 Drawing Sheets

(56) References Cited

U.S. PATENT DOCUMENTS

2013/0313874 A1* 11/2013 Neuber et al. ........... 297/256.13
2014/0008955 A1* 1/2014 Spence ................. B60N 2/265
                                                       297/256.16

FOREIGN PATENT DOCUMENTS

CN        203528337 U    4/2014
JP          61143238     6/1986

* cited by examiner

CHILD SAFETY SEAT

CROSS REFERENCE TO RELATED APPLICATIONS

This application claims the benefit of U.S. Provisional Application No. 61/851,466 filed on Mar. 8, 2013 is incorporated herein by reference.

BACKGROUND OF THE INVENTION

1. Field of the Invention

The invention relates to a child safety seat, and especially relates to a child safety seat capable of being reclined.

2. Description of the Prior Art

Child safety seats are used in motor vehicles to properly restrain a child in the event of an accident. A recline mechanism is often added to a child safety seat in order to provide more comfort to the child and to improve the fit of the child safety seat in a wider variety of vehicle seats. However, many recline mechanisms are complex and costly as a result of providing strong, robust design and to make the feature visible to the parents and caregivers at retail. A simple cost-effective recline mechanism, such as a simple rotating foot, is typically more difficult to operate and is often overlooked in the retail display.

SUMMARY OF THE INVENTION

An objective of the invention is to provide a child safety seat with a reclining foot, for reclining the child safety seat by a simple operation.

The child safety seat includes a seat body, a reclining foot, and a force-generating member. The seat body has a lower portion and a blocking structure at the lower portion. The lower portion thereon defines a first position and at least one second position. The reclining foot is connected to the lower portion such that the reclining foot is capable of rotating and sliding relative to the seat body to be selectively located at the first position or the second position. The force-generating member is connected to the seat body and the reclining foot for applying a force to the reclining foot for urging the reclining foot to move toward the first position. Therein, when the reclining foot is located at the first position, the reclining foot is capable of being rotated in a rotation direction relative to the seat body and slid in a sliding direction relative to the seat body in a distance to be blocked by the blocking structure from rotating reversely under the force so as to be located at the second position. When the reclining foot is located at the second position, the reclining foot is capable of being slid in a direction reverse to the sliding direction relative to the seat body in the distance and rotated in a direction reverse to the rotation direction under the force so as to be located at the first position. In an embodiment, when the reclining foot is located at the second position, the reclining foot protrudes from the lower portion for reclining the child safety seat such as on a vehicle seat; when the reclining foot is located at the first position, the reclining foot retracts into the lower portion for relatively disposing the child safety seat upright.

Compared with the prior art, the child safety seat also provide a recline feature with the reclining foot. Further, the operation of the reclining foot is simple and reliable. A user can easily perform an operation of rotating and sliding the reclining foot for selectively reclining or upright disposing the child safety seat such as on a vehicle seat.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
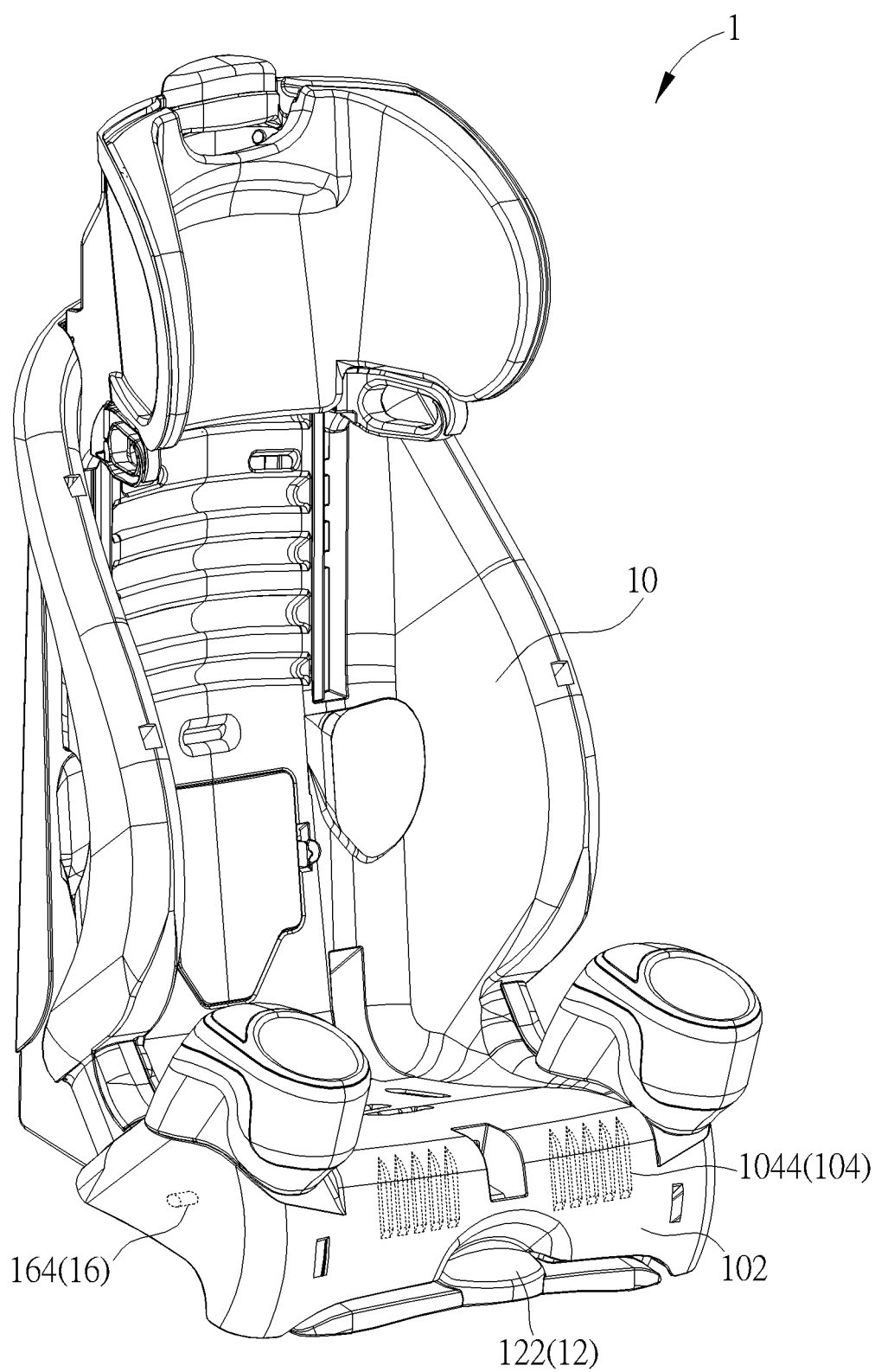
FIG. 1 is a perspective view of a child safety seat of an embodiment according to the invention.
Figure 2:
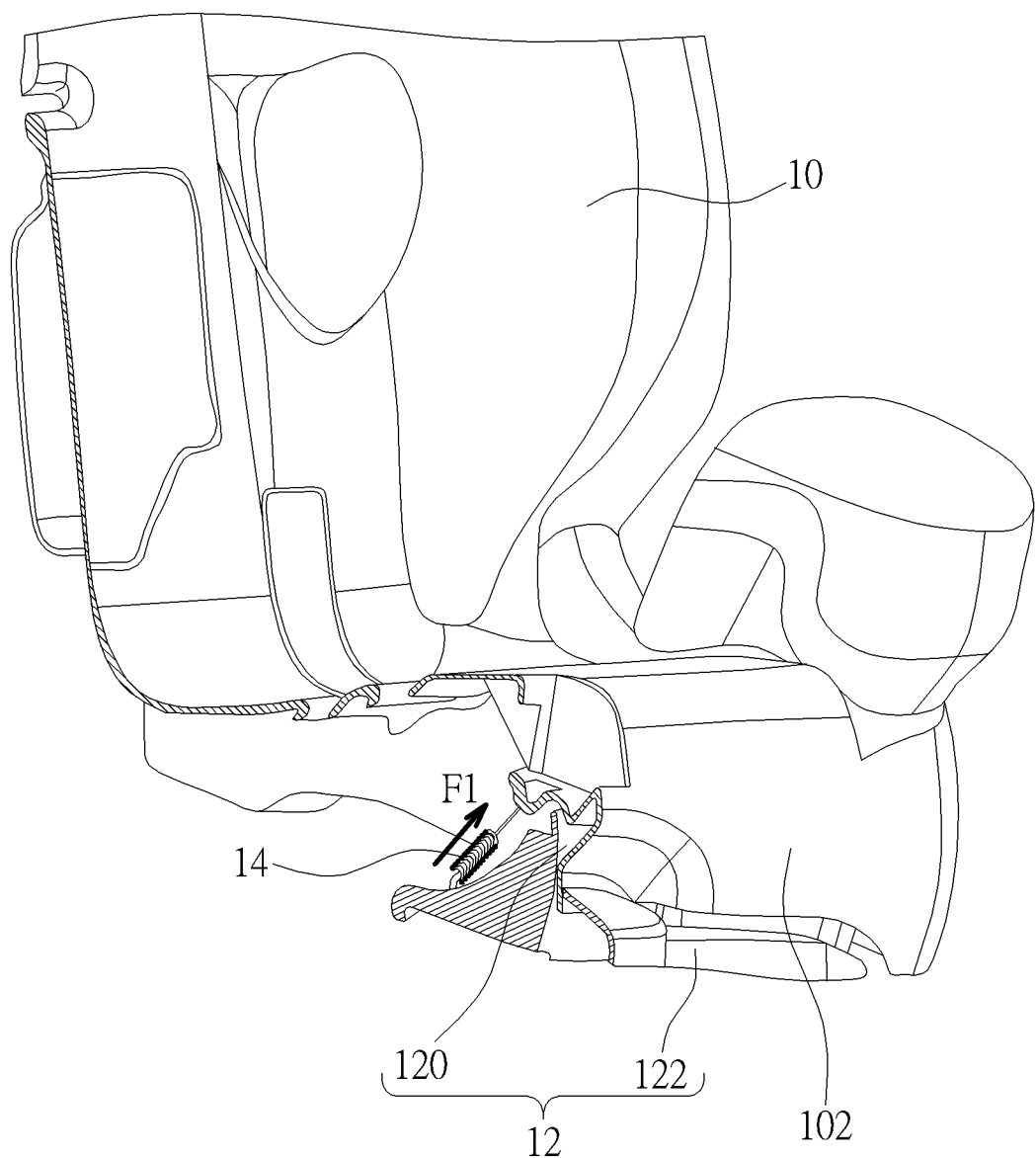
FIG. 2 is a sectional view of the child safety seat FIG. 1 with a reclining foot located at a first position.

Please refer to FIG. 1 and FIG. 2. FIG. 1 is a perspective view of a child safety seat 1 of an embodiment according to the invention. FIG. 2 is a sectional view of the child safety seat 1. The child safety seat 1 includes a seat body 10, a reclining foot 12 (of which the hidden profile is shown roughly by dashed lines in FIG. 1), and a force-generating member 14. The seat body 10 has a lower portion 102, where the reclining foot 12 is connected such that the reclining foot 12 is capable of rotating and sliding relative to the seat body 10. The force-generating member 14 is connected to the seat body 10 and the reclining foot 12 for applying a force F1 to the reclining foot 12 for urging the reclining foot 12 to move. In the embodiment, the lower portion 102 thereon defines two positions. Therein, one of the two positions is defined as a first position (or an upright position), shown by FIG. 1; the other is defined as a second position (or a reclined position), shown by FIG. 3. When the reclining foot 12 is located at the second position, the reclining foot 12 protrudes from the lower portion 102 for reclining the child safety seat 1 on a vehicle seat; when the reclining foot 12 is located at the first position, the reclining foot 12 retracts into the lower portion 102 for relatively disposing the child safety seat 1 upright such as on the vehicle seat. Therein, the upright position and the reclined position can be understood to make the back of the seat body 10 upright and reclined respectively. Furthermore, although only one second position is shown in this embodiment, more second positions may be defined for more choices of reclining angles. In addition, in the embodiment, the reclining foot 12 is located at a front side of the seat body 10 for convenience of operation, but the invention is not limited thereto.

Figure 4:
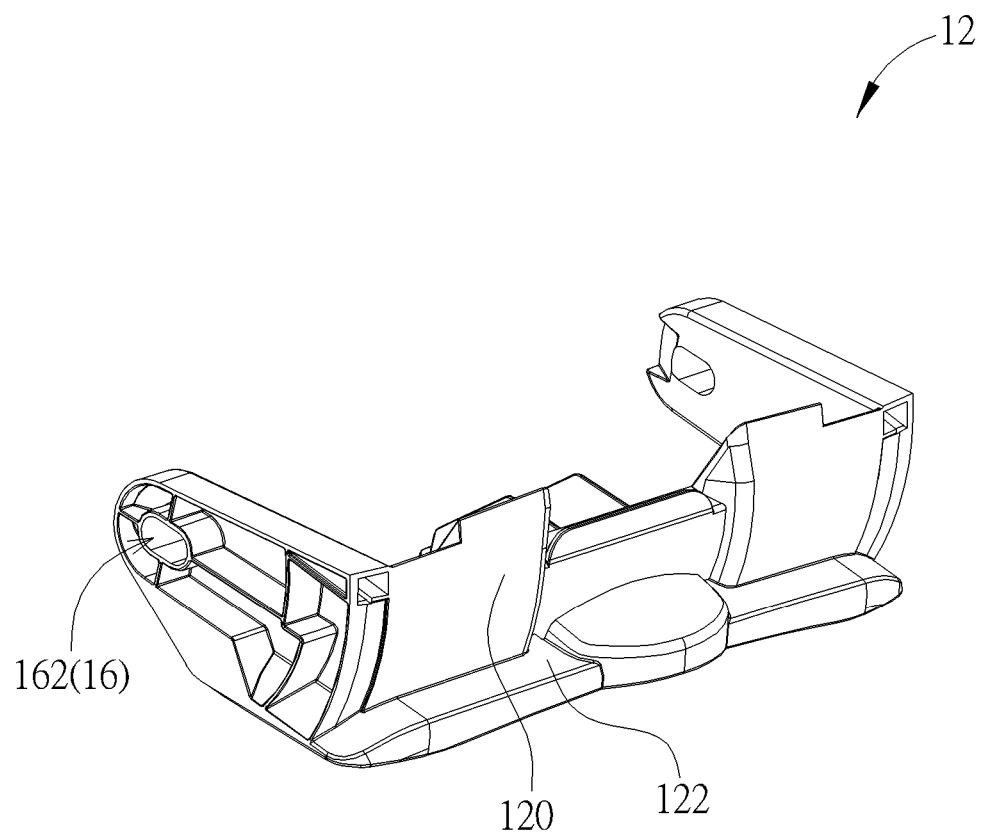
FIG. 4 is a perspective view of the reclining foot.

Please also refer to FIG. 4. FIG. 4 is a perspective view of the reclining foot 12. The reclining foot 12 is connected to the lower portion 102 by a connecting mechanism 16 which includes a slot 162 and a pivot 164 (shown by dashed lines in FIG. 1) relatively rotatably and slidably disposed in the slot 162. The slot 162 extends in a distance so that the pivot 164 can slide in the slot 162 relative to the reclining foot 12. Thereby, the reclining foot 12 is capable of rotating and sliding relative to the seat body 10 to be selectively located at the first position or the second position relative to the seat body 10. In the embodiment, the slot 162 is provided together with the reclining foot 12 made in one piece such as by plastic injection. The pivot 164 can be provided together with the seat body 10 by a similar way. Therefore, the connecting mechanism 16 is simple in structure design and cost low in manufacturing. However, the invention is not limited thereto. In addition, it is also practicable to dispose the slot 162 on the lower portion 102 of the seat body 10 and the pivot 164 on the reclining foot 12.

As shown in FIG. 2, in the embodiment, the force-generating member 14 is an extension spring, of which two ends are connected to the seat body 10 and the reclining foot 12 respectively. So the force F1 is a pulling force applied to the reclining foot 12 so that the reclining foot 12 has a tendency to rotate anticlockwise (according to the viewpoint of FIG. 2) about the pivot 164 (referring to FIG. 1). The reclining foot 12 has a locking tab 120 and a foot portion 122. Therein, the end of the extension spring connected to the reclining foot 12 is located between the locking tab 120 and the portion of the reclining foot 12 where the slot 162 is disposed. As shown by FIG. 1 and FIG. 2, although the reclining foot 12 tends to rotate anticlockwise under the force F1, the reclining foot 12 is still blocked by the lower portion 102 so the reclining foot 12 can be held at the first position, for example by the bottom of the lower portion 102 blocking the foot portion 122 or by another structure of the lower portion 102 blocking the locking tab 120. Furthermore, when the reclining foot 12 is located at the first position, the reclining foot 12 retracts into the lower portion 102 so that the locking tab 120 is covered by the lower portion 102 to be invisible or unobvious.

Figure 3:
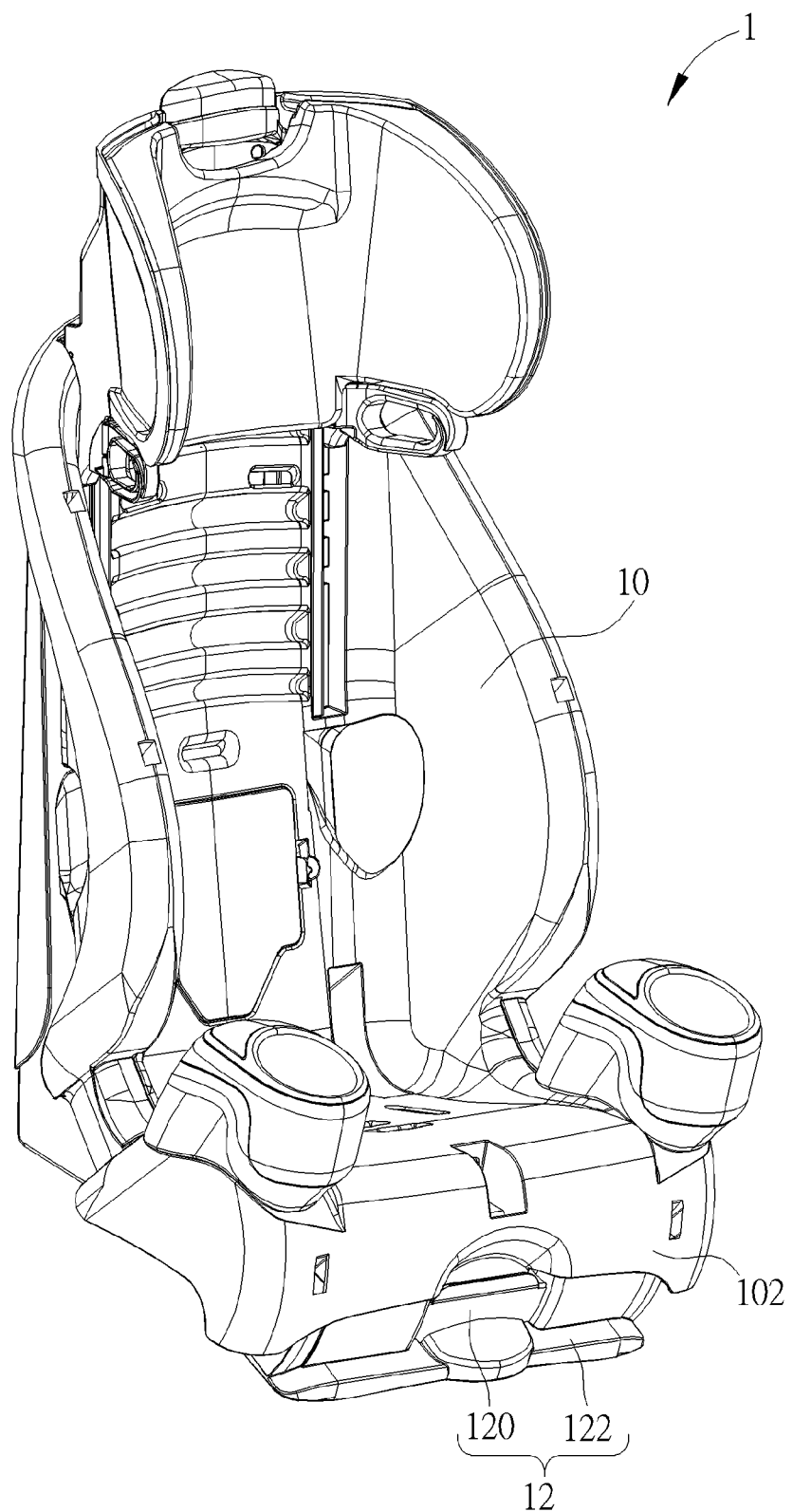
FIG. 3 is another perspective view of the child safety seat in FIG. 1 with the reclining foot located at a second position.
Figure 5:
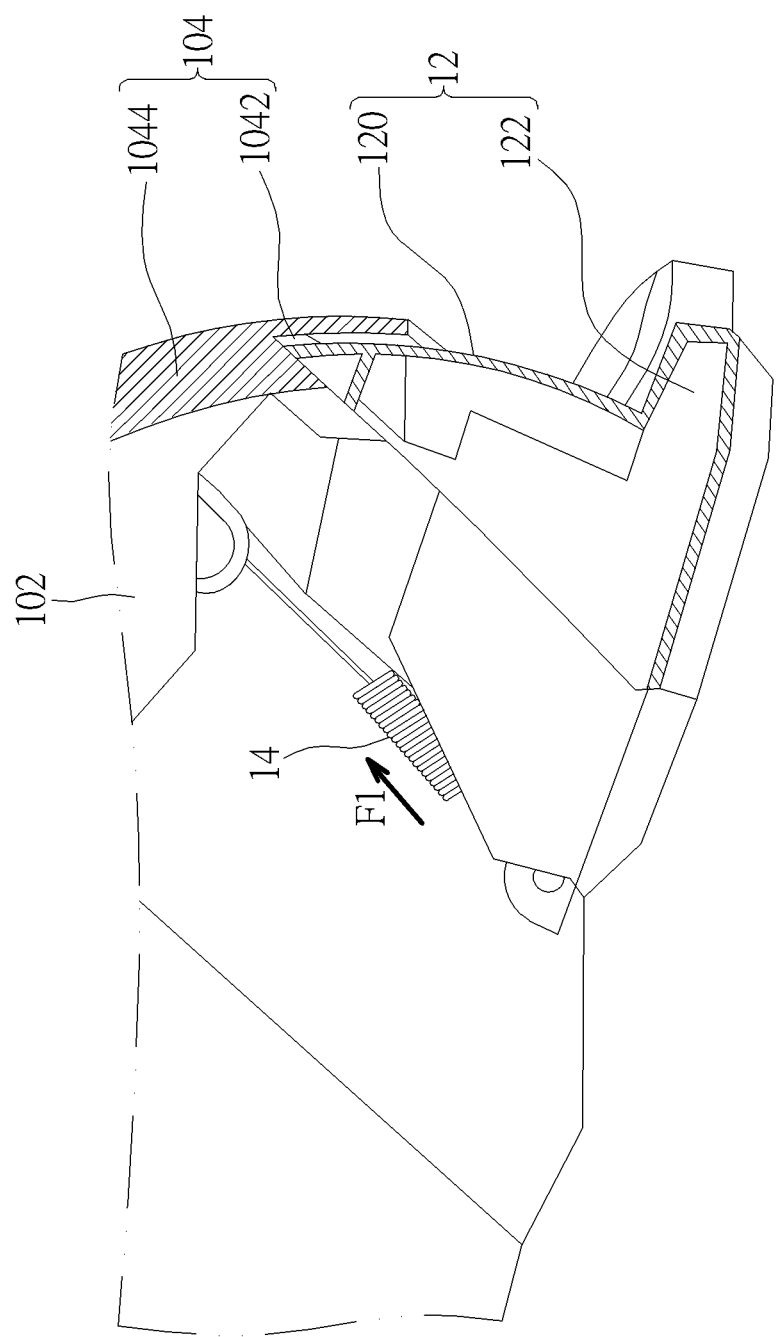
FIG. 5 is a sectional view of the child safety seat in FIG. 3.
Figure 6:
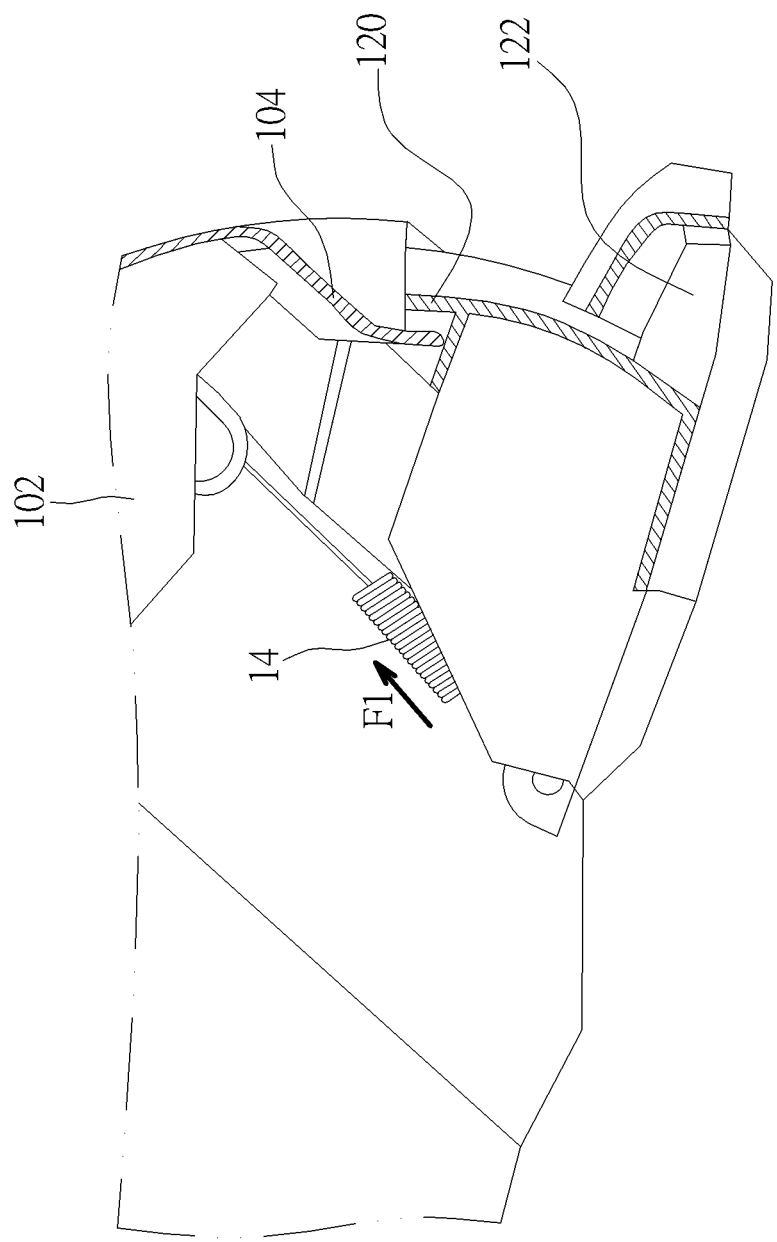
FIG. 6 is another sectional view of the child safety seat in FIG. 3 in a different cutting plane.

Please refer to FIGS. 3, 5 and 6. FIG. 5 and FIG. 6 are sectional views of the child safety seat 1 with the reclining foot 12 located at the second position in different cutting planes. The seat body 10 has a blocking structure 104 at the lower portion 102. The blocking structure 104 is used for blocking the reclining foot 12 from rotating toward the first position. In the embodiment, the blocking structure 104 is a structurally reinforced side wall of the lower portion 102. The blocking structure 104 forms a locking slot 1042 for locking the locking tab 120 from rotating anticlockwise further. As shown by FIG. 5 and FIG. 6, even though the force F1 urges the reclining foot 12 to rotate anticlockwise, the reclining foot 12 is still blocked by the blocking structure 104 through the locking tab 120 so that the reclining foot 12 can be held at the second position. Furthermore, when the reclining foot 12 is located at the second position, the reclining foot 12 protrudes from the lower portion 102 so that the locking tab 120 is exposed out the lower portion 102 to be visible. The sight change of the locking tab 120 can indicate to the user at which position the reclining foot 12 is located currently, conducive to the assurance of operating the reclining foot 12 correctly.

Figure 7:
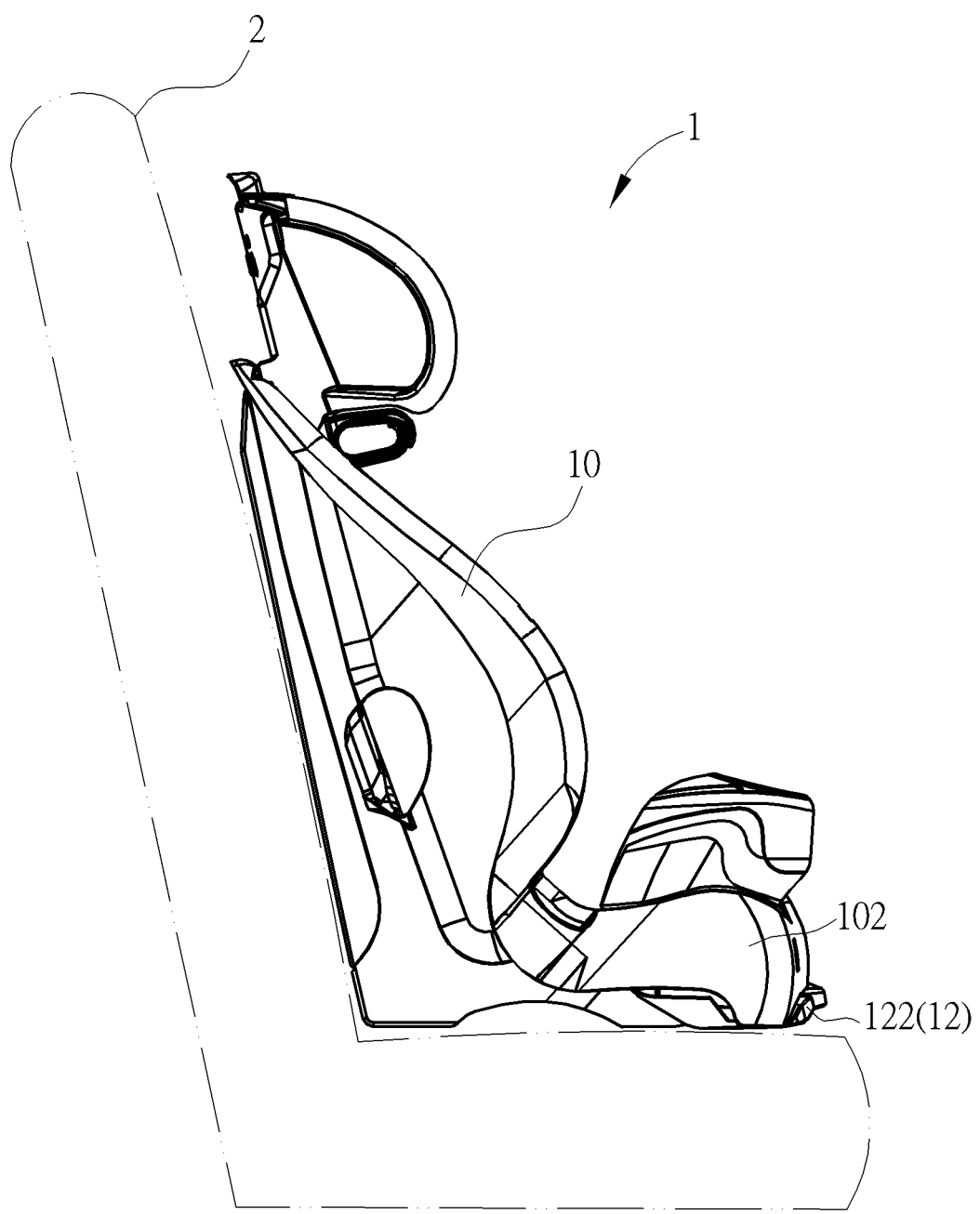
FIG. 7 is a side view of the child safety seat in FIG. 1 with the reclining foot located at the first position.
Figure 8:
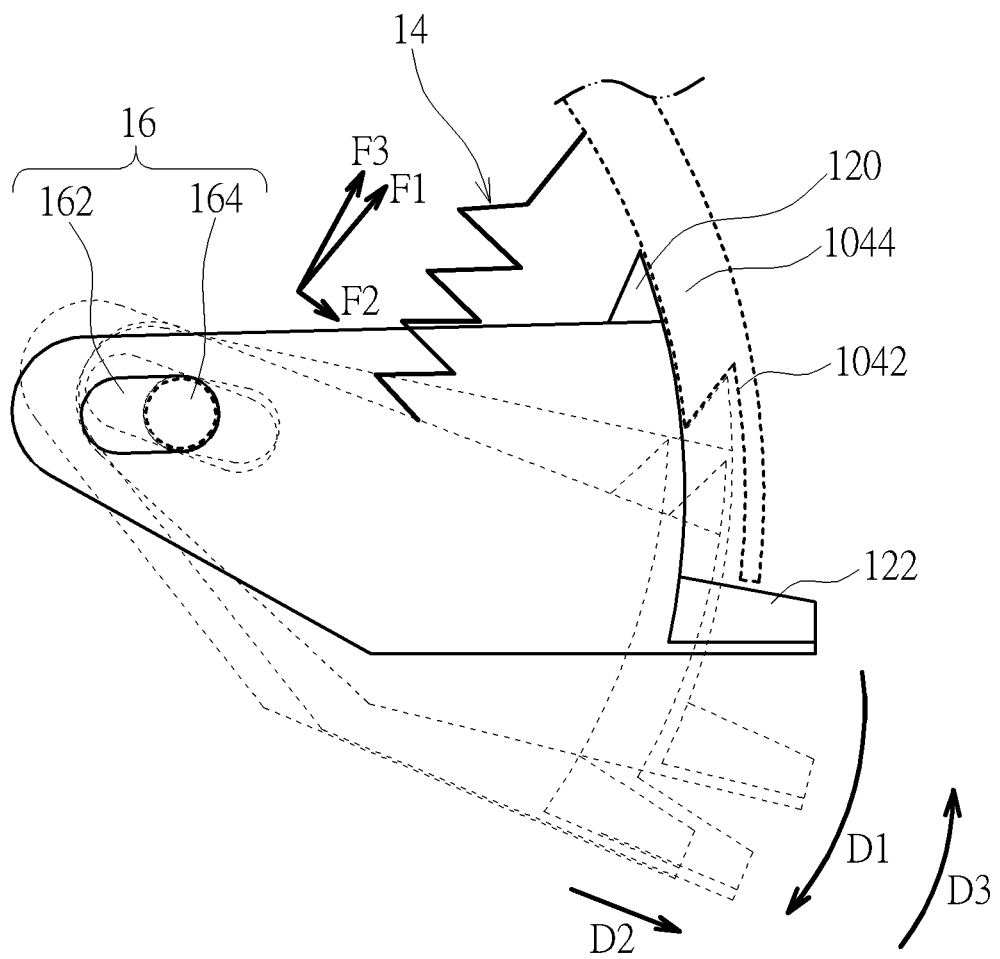
FIG. 8 is a schematic diagram illustrating the movement of the reclining foot relative to the seat body from the first position to the second position in FIG. 7.

Please refer to FIG. 7 and FIG. 8. FIG. 7 is a side view of the child safety seat 1 with the reclining foot 12 located at the first position. FIG. 8 is a schematic diagram illustrating the movement of the reclining foot 12 relative to the seat body 10 from the first position to the second position (shown by dashed lines); therein, the reclining foot 12 shown by solid lines presents being located at the first position, and the others present transitions to the second position. The reclining foot 12 shown by solid lines in FIG. 7 is located at the first position, so the child safety seat 1 can be disposed upright or normally on a vehicle seat 2 (indicated by chained lines) with an anchor mechanism or a safety belt. When the user wants to recline the child safety seat 1, the user can rotate the reclining foot 12 in a rotation direction D1 (i.e. rotate clockwise) relative to the seat body 10. The slot 162 rotates together with the reclining foot 12 relative to the pivot 164 in an angle such that the locking tab 120 is capable of moving over the ribs 1044 of the blocking structure 104 or getting in the locking slot 1042 later. During the rotation, the ribs 1044 provide supporting for the locking tab 120, which is conducive to stability of the rotation, the pivot 164 keeps at an end of the slot 162 substantially, and the force-generating member 14 is stretched elastically. The force F1 increases accordingly.

Then, the user can pull the reclining foot 12 outward; that is, the reclining foot 12 slides in a sliding direction D2 relative to the seat body 10 in a distance to cross the ribs 1044. The distance is not longer than the extension length of the slot 162 in principle. In the embodiment, the distance is substantially equal to the extension length, so the pivot 164 is located at the other end of the slot 162 after the sliding. By the resilient effect of the force-generating member 14, the force F1 helps the reclining foot 12 rotate reversely (i.e. in a direction D3 reverse to the rotation direction D1) until the reclining foot 12 is blocked by the blocking structure 104 from further rotating reversely under the force F1. In practice, the rotation angle in the direction D3 usually is small relative to the angle in the rotation direction D1; however, the invention is not limited thereto. At the moment, the locking tab 120 is locked by the locking slot 1042 so that the reclining foot 12 is located at the second position (referring to FIG. 3 or FIG. 9). The locking tab 120 is not covered entirely by the lower portion 102 and therefore is exposed.

It is added that according to the configuration of the lower portion 102, the reclining foot 12, and the force-generating member 14, the extension spring (i.e. the force-generating member 14) is obliquely disposed relative to the rotation direction D3, so the force F1 has a positive component F2 in the sliding direction D2 and another positive component F3 in the direction reverse to the rotation direction D1. Hence, the positive component F2 urges the reclining foot 12 to slide in the sliding direction D2 relative to the seat body 10, and facilitates the sliding of the reclining foot 12 in the sliding direction D2. Similarly, the positive component F3 urges the reclining foot 12 to rotate anticlockwise.

Figure 9:
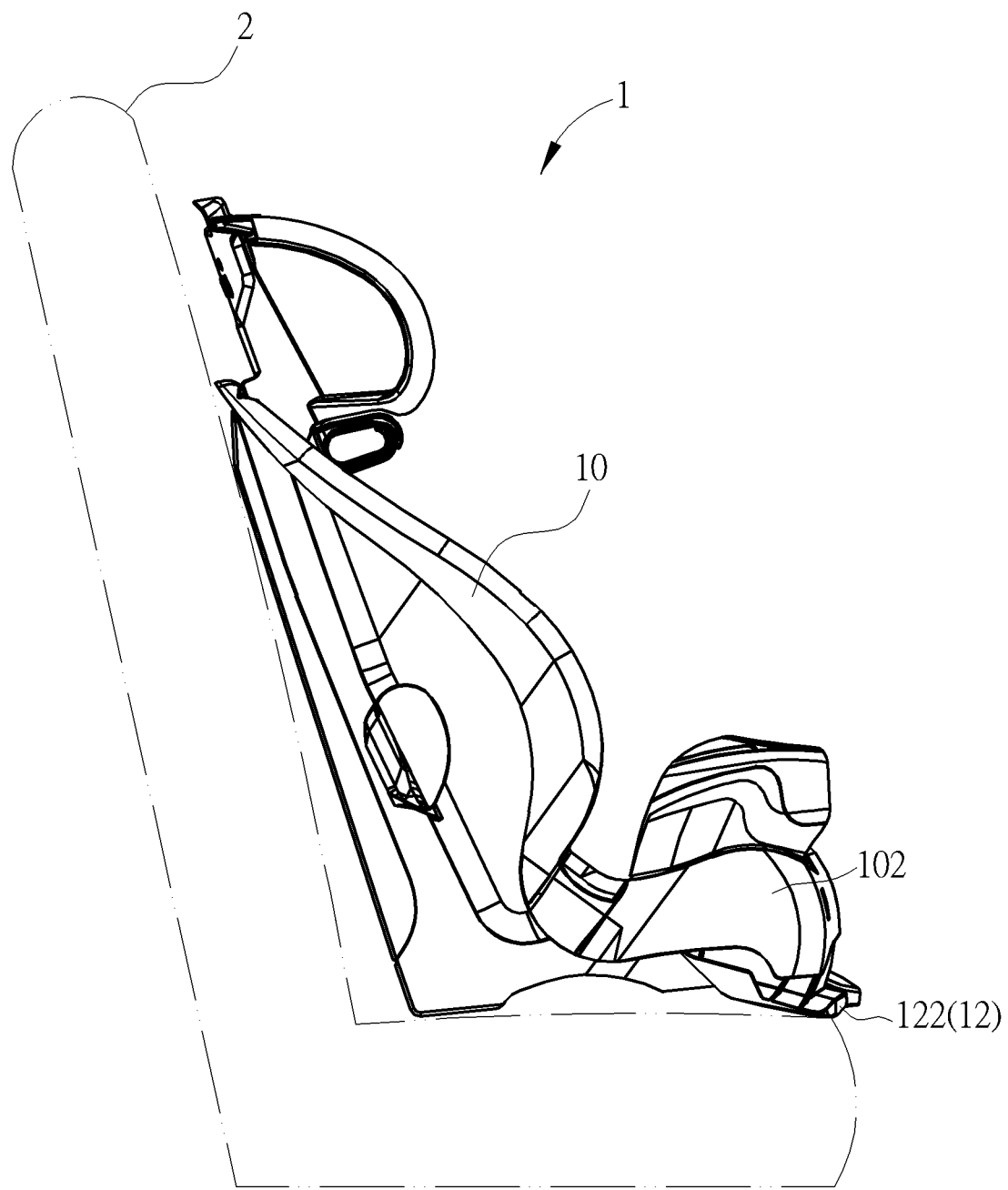
FIG. 9 is a side view of the child safety seat in FIG. 3 with the reclining foot located at the second position.
Figure 10:
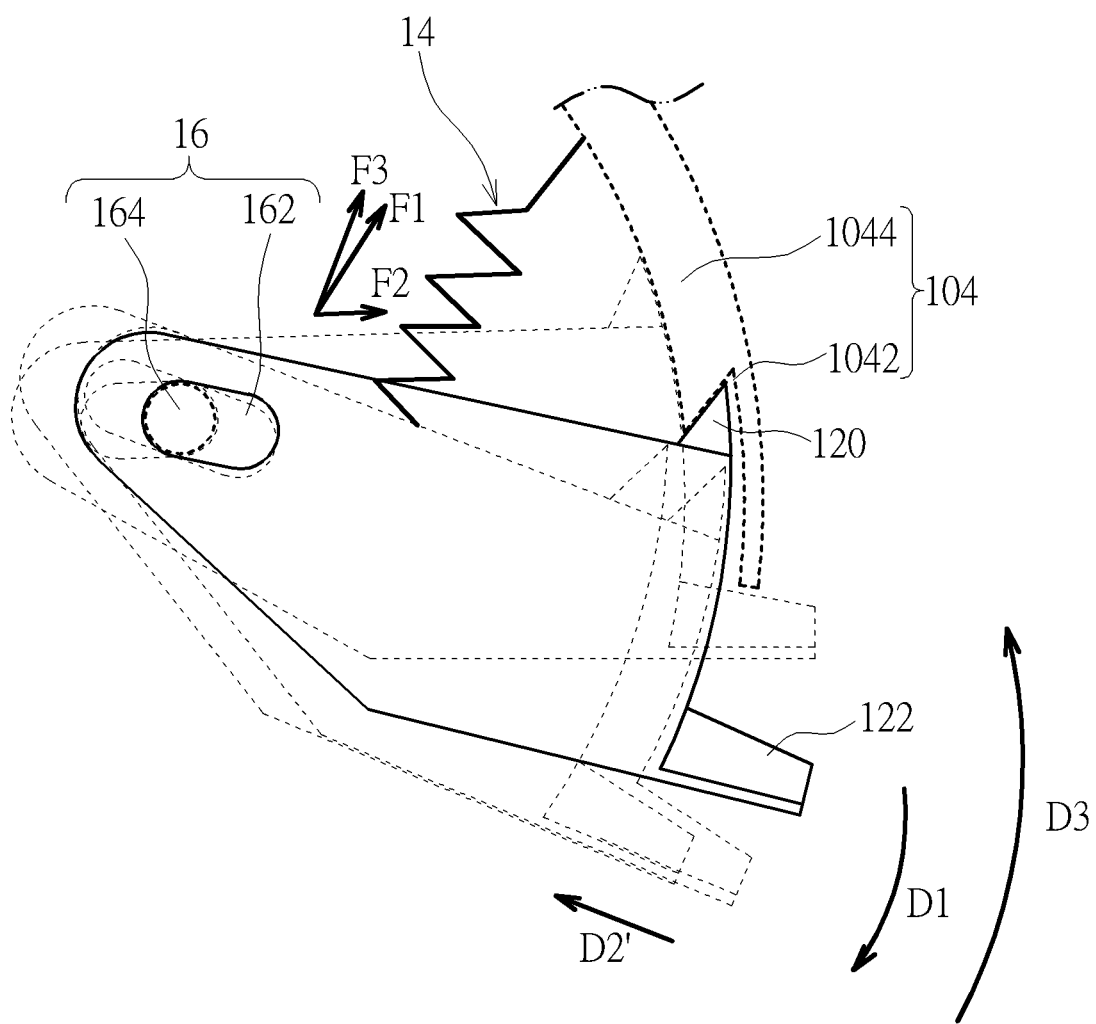
FIG. 10 is a schematic diagram illustrating the movement of the reclining foot relative to the seat body from the second position to the first position in FIG. 9.

Please refer to FIG. 9 and FIG. 10. FIG. 9 is a side view of the child safety seat 1 with the reclining foot 12 located at the second position. FIG. 10 is a schematic diagram illustrating the movement of the reclining foot 12 relative to the seat body 10 from the second position to the first position (shown by dashed lines); therein, the reclining foot 12 shown by solid lines presents being located at the second position, and the others present transitions to the first position. The reclining foot 12 shown by solid lines in FIG. 9 is located at the second position, so the child safety seat 1 is reclined on the vehicle seat 2; therein, the child safety seat 1 is supported by an upper portion and a bottom middle portion of the seat body 10 and the foot portion 122 onto the vehicle seat 2. At the moment, the seat body 10 shows a substantially V-shaped configuration. The child safety seat 1 in such configuration can provide more comfort to a child sit thereon. When the user wants to make the child safety seat 1 disposed upright, the operation thereto is reverse to the above operation for reclining the child safety seat 1 in principle. The details of the operation for disposing the child safety seat 1 upright will be described in the following.

The user needs to rotate the reclining foot 12 in the rotation direction D1 in a small angle for disengaging the locking tab 120 from the locking slot 1042 of the blocking structure 104. Then, the user can push the reclining foot 12 inward in a direction D2' reverse to the sliding direction D2 in the distance (substantially equal to the extension length of the slot 162) to cross the ribs 1044. Under the resilient effect of the force-generating member 14 (i.e. by the positive component F3), the reclining foot 12 tends to rotate reversely (i.e. in the direction D3). When the user release the reclining foot 12, the reclining foot 12 will rotate anticlockwise (i.e. upward substantially) to retracts into the lower portion 102 until the lower portion 102 blocking the foot portion 122 or by another structure of the lower portion 102 blocking the locking tab 120, so as to be located at the first position. At the moment, the locking tab 120 is covered by the lower portion 102 to be invisible or unobvious. Now the user can dispose the child safety seat 1 upright on the vehicle seat 2, as shown in FIG. 7.

As previously mentioned, in the above embodiment, the child safety seat 1 is illustrated based on that the reclining foot 12 can be located at only two supporting positions (i.e. the first and second positions), but the invention is not limited thereto. In practice, the blocking structure 104 can be modified to have more locking slots or the like for blocking the reclining foot 12 (or the locking tab 120) so that the lower portion 102 thereon can define more reclined positions for reclining the child safety seat 1 on the vehicle seat 2. In addition, in the above embodiment, the first position is where the reclining foot 12 retracts into the lower portion 102 for disposing the child safety seat 1 upright; the second position is where the reclining foot 12 protrudes out the lower portion 102 for reclining the child safety seat 1. However, the invention is not limited thereto. For example, the force generated by the force-generating member is a pushing force to urge the reclining foot to protrude out the lower portion, and the blocking structure is disposed to block the reclining foot from rotate out the lower portion or keep the reclining foot retracted in the lower portion. In such case, the position where the reclining foot protrudes out the lower portion for reclining the child safety seat is regarded as the first position; the position where the reclining foot retracts into the lower portion for disposing the child safety seat upright is regarded as the second position. If the reclining foot is required to move from the first position to the second position (i.e. from a reclined position to an upright position), the reclining foot still needs to rotate, slide and rotate reversely to be located at the second position.

Compared with the prior art, the operation for changing the disposition of the child safety seat 1 is simple, mainly by rotating and sliding. Further, the sight change of the locking tab 120 assists the user in determining whether the reclining foot 12 is located correctly, which makes the operation reliable and easy. In addition, the mechanism for adjusting the position of the reclining foot relative to the seat body can be designed with simple structure and can be provided together with other components for reducing manufacturing difficulty and saving manufacturing cost.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A child safety seat, comprising:
a seat body having a lower portion and a blocking structure at the lower portion, the lower portion thereon defining a first position and at least one second position;
a reclining foot connected to the lower portion such that the reclining foot is capable of rotating and sliding relative to the seat body to be selectively located at the first position or the second position wherein the reclining foot is connected to the lower portion by a connecting mechanism, the connecting mechanism comprises a slot and a pivot relatively rotatably and slidably disposed in the slot, the slot is disposed on one of the reclining foot and the lower portion, and the pivot is disposed on the other of the reclining foot and the lower portion; and
a force-generating member connected to the seat body and the reclining foot for applying a force to the reclining foot for urging the reclining foot to move toward the first position;
wherein when the reclining foot is located at the first position, the reclining foot is capable of being rotated in a rotation direction relative to the seat body and slid in a sliding direction relative to the seat body in a distance so as to be located at the second position where the blocking structure blocks the reclining foot from rotating in a direction opposite to the rotation direction under the force.

2. The child safety seat of claim 1, wherein when the reclining foot is located at the second position, the reclining foot protrudes from the lower portion for reclining the child safety seat, and when the reclining foot is located at the first position, the reclining foot retracts into the lower portion for relatively disposing the child safety seat upright.

3. The child safety seat of claim 1, wherein the reclining foot has a locking tab, and the reclining foot is blocked by the blocking structure through the locking tab when the reclining foot is located at the second position.

4. The child safety seat of claim 3, wherein the locking tab is visible when the reclining foot is located at the second position, and the locking tab is covered by the lower portion when the reclining foot is located at the first position.

5. The child safety seat of claim 3, wherein the blocking structure is a structurally reinforced side wall of the lower portion, and the blocking structure forms a locking slot for locking the locking tab.

6. The child safety seat of claim 1, wherein the force also urges the reclining foot to slide in the sliding direction relative to the seat body.

7. The child safety seat of claim 6, wherein the force-generating member is an extension spring, the force is a pulling force to the reclining foot, and the pulling force has a positive component in the sliding direction and another positive component in a direction reverse to the rotation direction.

8. The child safety seat of claim 1, wherein the reclining foot is located at a front side of the seat body.

* * * * *

UNITED STATES PATENT AND TRADEMARK OFFICE
CERTIFICATE OF CORRECTION

| | | |
|---|---|---|
| PATENT NO. | : 9,327,619 B2 | |
| APPLICATION NO. | : 14/198607 | |
| DATED | : May 3, 2016 | |
| INVENTOR(S) | : Andrew J. Taylor et al. | |

It is certified that error appears in the above-identified patent and that said Letters Patent is hereby corrected as shown below:

Title page, item (73), correct the name of the assignee from

"Livingstyle Enterprises limited" to

"Wonderland Nurseygoods Company Limited"

Signed and Sealed this
Nineteenth Day of July, 2016

Michelle K. Lee
*Director of the United States Patent and Trademark Office*